(12) United States Patent
Jones et al.

(10) Patent No.: US 12,638,608 B2
(45) Date of Patent: May 26, 2026

(54) CEMENT VALIDATION BY DOWNHOLE ULTRASONIC MEASUREMENTS

(71) Applicant: Halliburton Energy Services, Inc., Houston, TX (US)

(72) Inventors: Paul J. Jones, Houston, TX (US); Sandip Prabhakar Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 73 days.

(21) Appl. No.: 18/492,599

(22) Filed: Oct. 23, 2023

(65) Prior Publication Data

US 2025/0130344 A1 Apr. 24, 2025

(51) Int. Cl.
*E21B 47/01* (2012.01)
*E21B 47/005* (2012.01)
*G01V 1/50* (2006.01)

(52) U.S. Cl.
CPC .............. *G01V 1/50* (2013.01); *E21B 47/005* (2020.05); *E21B 47/01* (2013.01)

(58) Field of Classification Search
CPC .......... E21B 47/01; E21B 47/005; G01V 1/50
USPC .................................................... 166/250.14
See application file for complete search history.

(56) References Cited

U.S. PATENT DOCUMENTS

| | | | |
|---|---|---|---|
| 5,741,971 A | | 4/1998 | Lacy |
| 5,927,948 A | * | 7/1999 | Perry .................... B64C 27/463 |
| | | | 244/17.11 |
| 5,937,948 A | * | 8/1999 | Robbins, III ....... E21B 17/1042 |
| | | | 166/380 |
| 6,125,935 A | * | 10/2000 | Shahin, Jr. ............ E21B 47/017 |
| | | | 166/250.14 |
| 6,279,392 B1 | | 8/2001 | Shahin, Jr. et al. |
| 7,663,969 B2 | | 2/2010 | Tang et al. |
| 8,584,519 B2 | * | 11/2013 | Maida ..................... E21B 47/16 |
| | | | 73/152.54 |
| 8,636,063 B2 | | 1/2014 | Ravi et al. |
| 9,732,607 B2 | | 8/2017 | Zeroug et al. |

(Continued)

FOREIGN PATENT DOCUMENTS

| | | |
|---|---|---|
| WO | 2020023895 | 1/2020 |

OTHER PUBLICATIONS

"PCT Application No. PCT/US2023/077692 International Search Report and Written Opinion", Jul. 17, 2024, 10 pages.

(Continued)

*Primary Examiner* — Nicole Coy
*Assistant Examiner* — Douglas S Wood
(74) *Attorney, Agent, or Firm* — DeLizio, Peacock, Lewin & Guerra LLP

(57) ABSTRACT

A method comprises positioning a transducer assembly to a casing string disposed in a wellbore formed in a subsurface formation, wherein an annular area between the casing string and the subsurface formation is at least partially filled with sealant. The method comprises transmitting, via the transducer assembly, signals into a measurement channel of the transducer assembly that is at least partially filled with the sealant. The method comprises acquiring, via the transducer assembly, response signals in response to transmission of the signals through the measurement channel. The method comprises determining one or more characteristics of the sealant in the measurement channel based on the response signals.

20 Claims, 5 Drawing Sheets

(56)  References Cited

U.S. PATENT DOCUMENTS

| | | | |
|---|---|---|---|
| 9,822,627 B2 | 11/2017 | Froelich | |
| 10,358,905 B2 | 7/2019 | Tello et al. | |
| 10,514,350 B2 | 12/2019 | Boul et al. | |
| 10,961,845 B2 * | 3/2021 | Roberson | E21B 47/005 |
| 2002/0062992 A1 * | 5/2002 | Fredericks | G01V 1/52 |
| | | | 324/369 |
| 2004/0112595 A1 * | 6/2004 | Bostick, III | E21B 47/06 |
| | | | 166/250.01 |
| 2004/0180793 A1 | 9/2004 | Ramos | |
| 2011/0192592 A1 * | 8/2011 | Roddy | E21B 47/10 |
| | | | 166/250.01 |
| 2014/0174732 A1 * | 6/2014 | Goodwin | E21B 47/13 |
| | | | 166/255.1 |
| 2017/0114626 A1 | 4/2017 | Bardapurkar et al. | |
| 2017/0199295 A1 | 7/2017 | Mandal | |
| 2018/0030824 A1 * | 2/2018 | Roberson | E21B 33/14 |
| 2019/0226320 A1 | 7/2019 | Gao et al. | |
| 2022/0034172 A1 * | 2/2022 | Patterson | E21B 47/01 |
| 2023/0220764 A1 | 7/2023 | Zhao et al. | |
| 2025/0109679 A1 | 4/2025 | Krueger et al. | |

OTHER PUBLICATIONS

Gowida, et al., "Cement Evaluation Challenges", Society of Petroleum Engineers, Kingdom of Saudi Arabia Annual Technical Symposium and Exhibition, Apr. 2018, 18 pages.

* cited by examiner

400

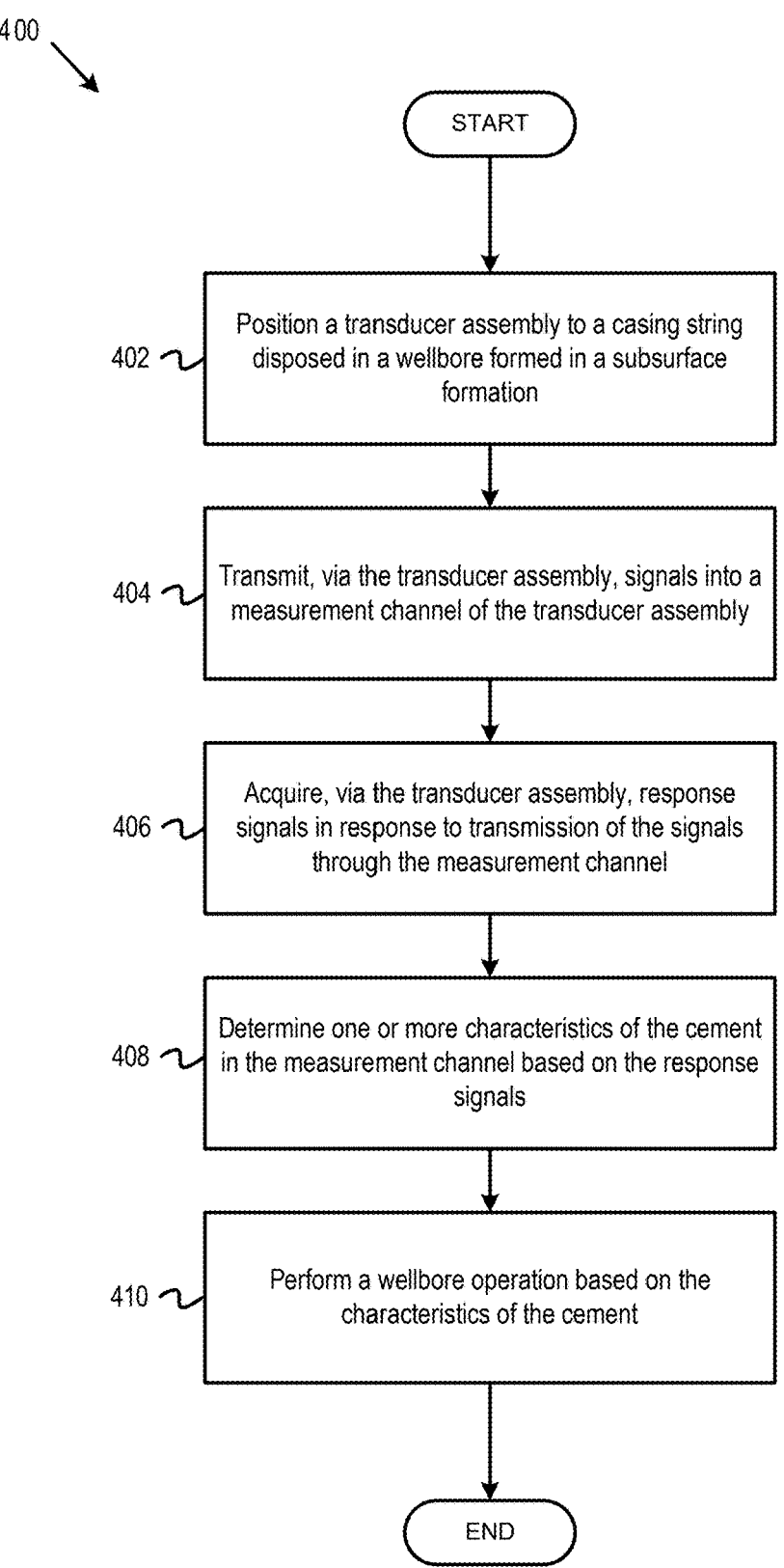

START

402 Position a transducer assembly to a casing string disposed in a wellbore formed in a subsurface formation 404 Transmit, via the transducer assembly, signals into a measurement channel of the transducer assembly 406 Acquire, via the transducer assembly, response signals in response to transmission of the signals through the measurement channel 408 Determine one or more characteristics of the cement in the measurement channel based on the response signals 410 Perform a wellbore operation based on the characteristics of the cement

END

501 — Processor

Network Interface —505

Bus

507 — Memory

Signal Processor —511

Controller —515

503

CEMENT VALIDATION BY DOWNHOLE ULTRASONIC MEASUREMENTS

FIELD

Some implementations relate generally to the field of cementing of casing disposed in a wellbore and more particularly to the field of determining characteristics of cement in a wellbore.

BACKGROUND

During the drilling and completion of wellbores in a subsurface formation, a casing string may be disposed in the wellbore to maintain the stability and integrity of the well-bore. A cement slurry may be placed in the annular area between the subsurface formation and the casing to ensure the integrity of the wellbore, protect the casing from exposure to reservoir fluids and isolate reservoirs within the subsurface formation. The cement may be placed in the annular area by pumping the cement slurry down the casing string and then up the annular to create a cement sheath barrier around the exterior of the casing once the cement hardens. The cement slurry may be designed to harden at the downhole pressures and temperatures of the subsurface formation. For example, the cement slurry may include additives to that allow the cement slurry to properly harden when in a high temperature and/or high pressure environment. The cement must possess specific characteristics when hardened to be effective, such a good compressive strength and stability. Failure to achieve the desired levels of the cement characteristics may result in damage to the casing and/or wellbore, loss of production, etc.

BRIEF DESCRIPTION OF THE DRAWINGS

Implementations of the disclosure may be better understood by referencing the accompanying drawings.

FIG. 4 is a flowchart of example operations for determining characteristics of cement in a wellbore, according to some implementations.

DESCRIPTION

Figure 1:
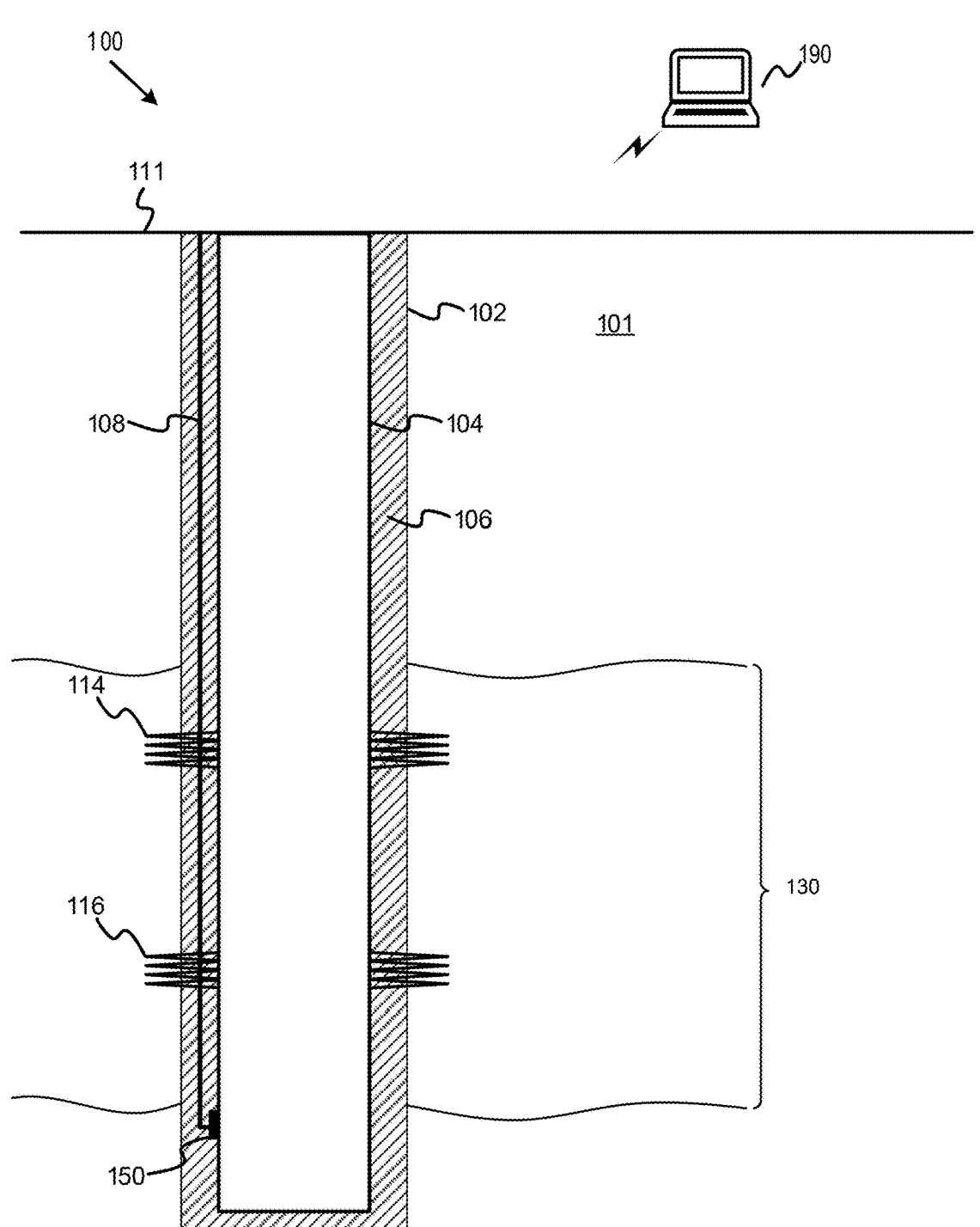
FIG. 1 is a diagrammatic illustration of an example well system, according to some implementations.

The description that follows includes example systems, methods, techniques, and program flows that embody aspects of the disclosure. However, it is understood that this disclosure may be practiced without these specific details. For instance, this disclosure refers to a transducer assembly comprising parallel fins. Aspects of this disclosure can also be applied to any other configuration of fins. In other instances, well-known instruction instances, protocols, structures, and techniques have not been shown in detail in order not to obfuscate the description.

Example implementations relate to determining one or more characteristics of sealants in a wellbore formed in a subsurface formation with at least one transducer assembly positioned on the casing string. Sealants may include fluids that may harden to create a sheath barrier around a casing string to isolate a casing string and/or wellbore from the subsurface formation such as cement (Portland cement, reduced Portland cement, sorel cement, calcium aluminate-based cement, etc.), epoxy resins, etc. Characteristics of the sealants, such as compressive strength, top of cement, percent of the annular area covered by cement, etc. may be utilized to evaluate the quality and effectiveness of the cement in the wellbore. For example, the cement top may need to be at a certain depth to isolate the wellbore from a reservoir, the compressive strength may indicate when the cement is fully set and drilling operation may continue, etc. Conventional approaches may evaluate the sealants through logging techniques. For example, a probe may be disposed in the wellbore, via wireline, to obtain measurements of the cement. These measurements may not be made while the well is producing due to the probe and wireline in the wellbore. Additionally, a logging unit may need to be mobilized to the wellbore location, resulting in additional costs. Alternatively, conventional approaches may rely on a recommended cement set time before continuing operations. For example, during drilling operations a casing string may be cemented in the wellbore, and drilling operations may cease for a the specified time to allow the cement to set. After the recommended set time, drilling operations may proceed to drill the next section of the wellbore, resulting in potential damage to the wellbore, casing, etc. if the sealant has not reached an optimal compressive strength. Conventional approaches may also include fiber installations that may only provide temperature and acoustic measurements. Real time measurements of the sealant may be required to accurately assess the cement sheath barrier integrity throughout cementing operations while also minimizing wellbore intervention.

In some implementations, one or more transducer assemblies may be positioned on a casing string disposed in a wellbore formed in a subsurface formation. Each of the transducer assemblies may be positioned on a collar and/or a the body of the casing string. In some implementations, the transducer assembly may be positioned on the casing string such that the transducer assembly may contact sealant that is placed in the wellbore. For example, the transducer assemblies may be positioned on the external face of the casing string (in the annular area between the casing and the wellbore wall) where cement may be placed. In some implementations, each transducer assembly may be configured with two or more fins, where the fins may be parallel to each other and at a fixed distance apart. Fluids (such as cement or other sealants, drilling mud, etc.) may enter the area between the fins (i.e., the measurement channel) when cement is placed in the wellbore. In some implementations, the transducer assembly may be configured to transmit a signal (such as ultrasonic signals) through the measurement channel that may be at least partially filled with sealant. The transducer assembly may acquire response signals in response to the transmission of the signals through the fixed distance of the measurement channel. The characteristics of the sealant may then be determined based on the response signals. For example, the measurement channel may be filled with cement, drilling fluid, etc. or a combination of fluids. Signals, such as ultrasonic signals, may be transmitted into the measurement channel. The response signals may be generated as the ultrasonic signals transmit through the fluid within the measurement channel. The response signals may then be processed to determine characteristics of the cement (if any is present) in the measurement channel such as compressive strength, percent of cement at the location of the transducer assembly, etc.

In some implementations, the transducer assemblies may be coupled with a tubing encapsulated cable to allow electrical communication to the surface. The response signals may be electrically communicated to the surface and processed to determine the characteristics of the sealant during cementing operations, providing valuable information of the cement sheath barrier integrity. In some implementations, the characteristics of the sealant may be utilized to perform wellbore operations. For example, operations may be initiated, modified, or stopped based on the characteristics of the cement. Examples of operations include proceeding with drilling operations, repairing casing and/or cement, etc. For instance, if the compressive strength of the cement indicate integrity of the cement is weak and/or the percent of the cement in the annular area is low, remediation operations may be performed such as perforating the casing and pumping additional cement into the annular area at the location of concern, running a probe in the wellbore to perform a cement bond log (CBL), etc.

Example Systems

FIG. 1 is a diagrammatic illustration of an example well system, according to some implementations. In particular, FIG. 1 is a schematic of a well system 100 that includes a wellbore 102 in a subsurface formation 101. The wellbore 102 includes casing 104 and number of perforations 114, 116 being made in the casing 104. Each set of perforations 114, 116 is located in a reservoir 130 to allow reservoir fluids (i.e., oil, water, and gas) from the reservoir 130 to flow into the wellbore 102 and to surface 111.

Cement 106 may be placed in the annular area between the wall of the wellbore 102 and the casing 104. Cement 106 may act as a barrier between the subsurface formation 101 and the casing 104 to protect the casing 104 from corrosive fluids, prevent hydraulic communication between the reservoir 130 and other reservoirs/the annular area, etc. FIG. 1 depicts the cement 106 in the annular area all the way to surface 111. In some implementations, the top of cement 106 may be below the surface 111. In some implementations, the annular area may include other fluids such as brine, drilling mud, etc.

The well system 100 may include a cable 108 (such as a tubing encapsulated cable) that is coupled with a transducer assembly 150 positioned on the external face of the casing 104, in the annular area. FIG. 1 depicts a singular transducer assembly position on the external face of the casing 104. The well system 100 may include more than one transducer assembly, positioned external and/or internal to the casing 104, and coupled to the cable 108. The transducer assembly 150 may be configured with two or more fins, and cement (or any other suitable fluid in the annular area) may be located in between the two or more fins. For example, the transducer assembly 150 may be at least partially filled with cement when the cement 106 is placed in the annular area. The transducer assembly 150 may be configured to transmit signals (such as ultrasonic signals) through the cement between the transducer assembly 150 fins, and acquire the response signals in response to the signals transmitting through the cement. The response signals from each of the transducer assembly 150 may then be electrically communicated to the surface 111, via the cable 108, for processing to determine characteristics of the cement 106.

The well system 100 includes a computer 190 that may be communicatively coupled to other parts of the well system 100 (such as one or more transducer assemblies). The computer 190 may be local or remote to the well system 100. A processor of the computer 190 may have perform commands (as further described below) to determine the characteristics of the cement 106. An example of the computer 190 is depicted in FIG. 4, which is further described below.

Example Transducer Assembly

Examples of a transducer assembly are now described. The transducer assembly is described in reference to the transducer assembly 150 of FIG. 1. The transducer assemblies described below are described with cement. Some implementations work with any suitable sealant. The transducer assembly may be applicable to cements such as Portland cement, reduced Portland cement, Sorel cement, calcium aluminate-based cement, etc., other sealants in a wellbore such as epoxy resins, and/or any suitable material utilized in a wellbore to isolate at least a portion of a casing string and/or the wellbore from the subsurface formation.

Figure 2B:
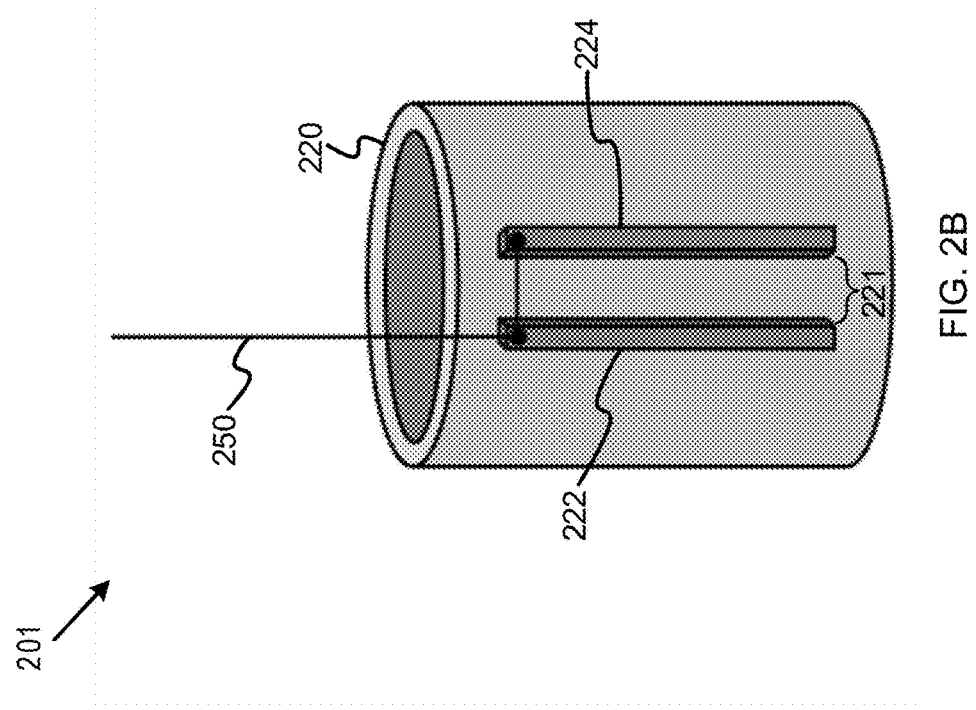
FIG. 2A-2B are schematics of an example transducer assembly, according to some implementations.
Figure 2A:
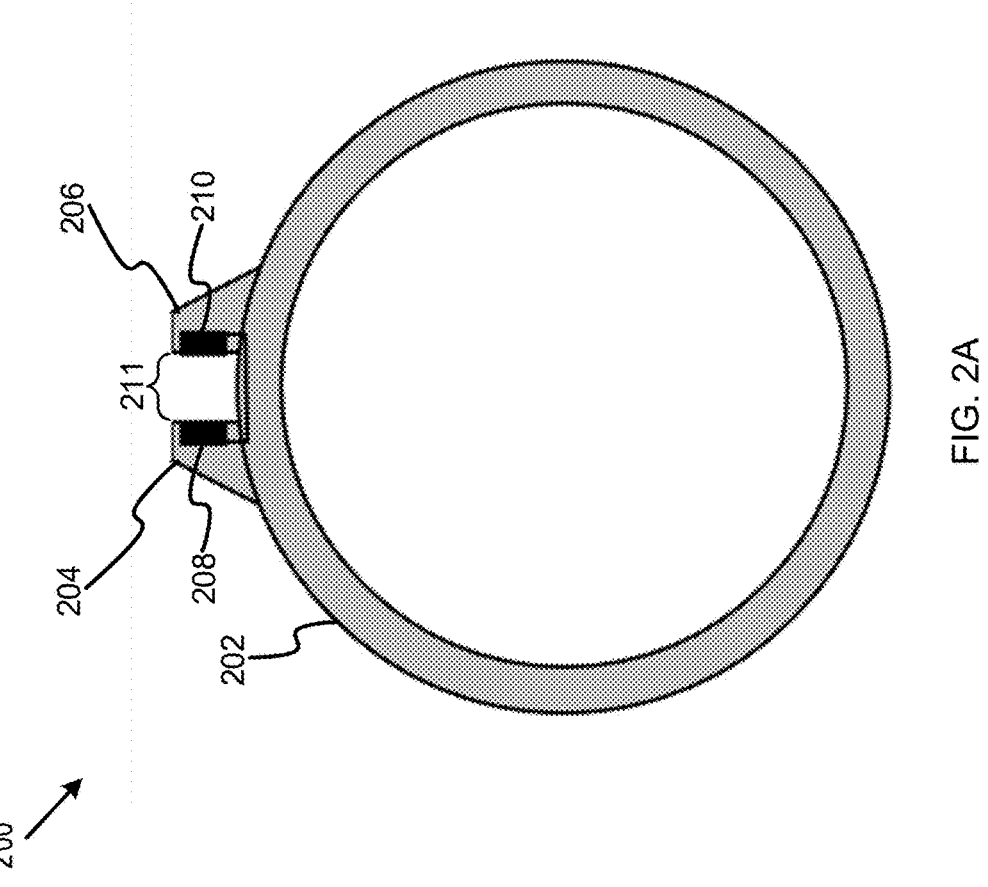

FIG. 2A-2B are schematics of an example transducer assembly, according to some implementations. In particular, FIG. 2A is a top view of a transducer assembly 200 (such as transducer assembly 150 of FIG. 1). The transducer assembly 200 includes fins 204 and 206 positioned on a segment of casing 202. The segment of the casing 202 may be a collar, the body of a casing joint, or any other suitable component of a pipe positioned in a wellbore. For example, the transducer assembly 200 may be positioned on a packer integrated into a casing string, a casing shoe, etc. The fins 204, 206 may be embedded to the casing 202, mounted to the casing 202, etc. Each fin 204, 206 may be constructed of steel, epoxy resin, or any other suitable material. The transducer assembly 200 depicts two fins. The transducer assembly 200 may include less than or more than two fins. Additionally, the transducer assembly 200 depicts the fins 204, 206 on the external face of the casing 202. The fins, 204, 206 may be positioned on other points of the casing 202 to be in contact with cement. For example, if cement is to be placed in the internal area of the casing 202, the fins 204, 206 may be positioned on the internal face of the casing 202 to contact the cement.

The area between fin 204 and fin 206 is a measurement channel 211 where fluids may flow through. For example, when the fins 204, 206 are on the external face of the casing 202, fluid (such as cement) may pass through the measurement channel 211 when cement is placed in the annular area between the wellbore wall and the external face of the casing.

The fin 204 is configured with a transducer 208 and the fin 206 is configured with a transducer 210. The transducers 208 and 210 are each configured to transmit signals and/or receive response signals within the measurement channel 211. The signals may include ultrasonic signals, acoustic signals, etc. For example, transducer 208 may transmit an ultrasonic signal into the measurement channel 211 that is at least partially filled with cement. Response signals may be generated by the cement as the signals interact with the cement. The response signals may reflect off of the fin 206 and transmit back towards the fin 204 for the transducer 208 to receive. Alternatively, or in addition to, the transducer 210 may receive the response signals. In some implementations, the signal may be transmitted by transducer 210 and response signals may be received by transducer 208 and/or transducer 210.

The internal faces of the fins 204 and 206 may be parallel to each other at a fixed distance. The transit time across the fixed distance between the two fins 204 and 206 (i.e., across the measurement channel 211) may be measured. For example, the time between when the transducer 208 transmits an ultrasonic signal into the measurement channel 211 and when the transducer 210 detects the response signal may be measured. Due to the fixed distance and transit time, the speed at which the signals traveled through the medium (cement, drilling mud, etc.) within the measurement channel 211 may be determined. The signal speed may then be correlated to the characteristics of the medium within the measurement channel. Operations for determining the cement characteristics are further described below.

FIG. 2B is a side view of a transducer assembly 201. Similar to the transducer assembly 200 of FIG. 2A, the transducer assembly 201 includes two fins 222 and 224 positioned on a casing 220. The fins 222, 224 may be parallel to each other at a fixed distance. The fins 222, 224 may be oriented parallel to the central axis of the casing 220 to allow cement to pass through the measurement channel 221 unrestricted. In some implementations, the fins 222, 224 may be mounted in a spiral direction around the outside of the casing 220 to permit cement flow through the measurement channel 221 and function as turbulizing elements. The fins 222, 224 may be positioned in any suitable configuration that may allow fluid to pass through the measurement channel 221.

A cable 250 may be coupled with the transducers within each respective fin 222, 224 and the surface to couple the transducer assembly 201 to the surface (such as a power source, computer 190 of FIG. 1, etc.). Additionally, the cable 250 may provide power to the transducer assembly 201. In some implementations, the cable 250 may be encapsulated in tubing, such as a steel pipe. Multiple transducer assemblies may be coupled to the cable 250. For example, the transducer assemblies may be in series and/or in parallel on the cable 250.

Figure 3B:
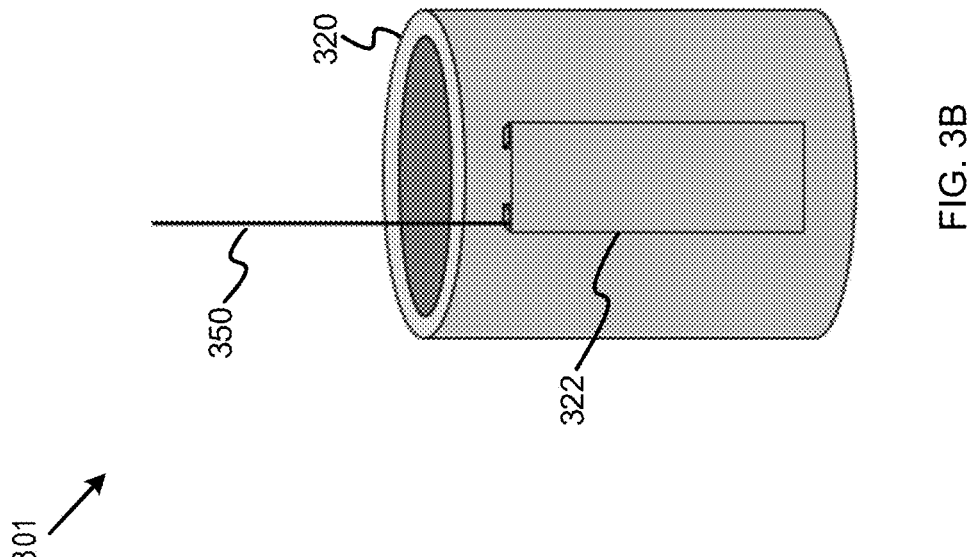
FIG. 3A-3B are schematics of an example transducer assembly, according to some implementations.
Figure 3A:
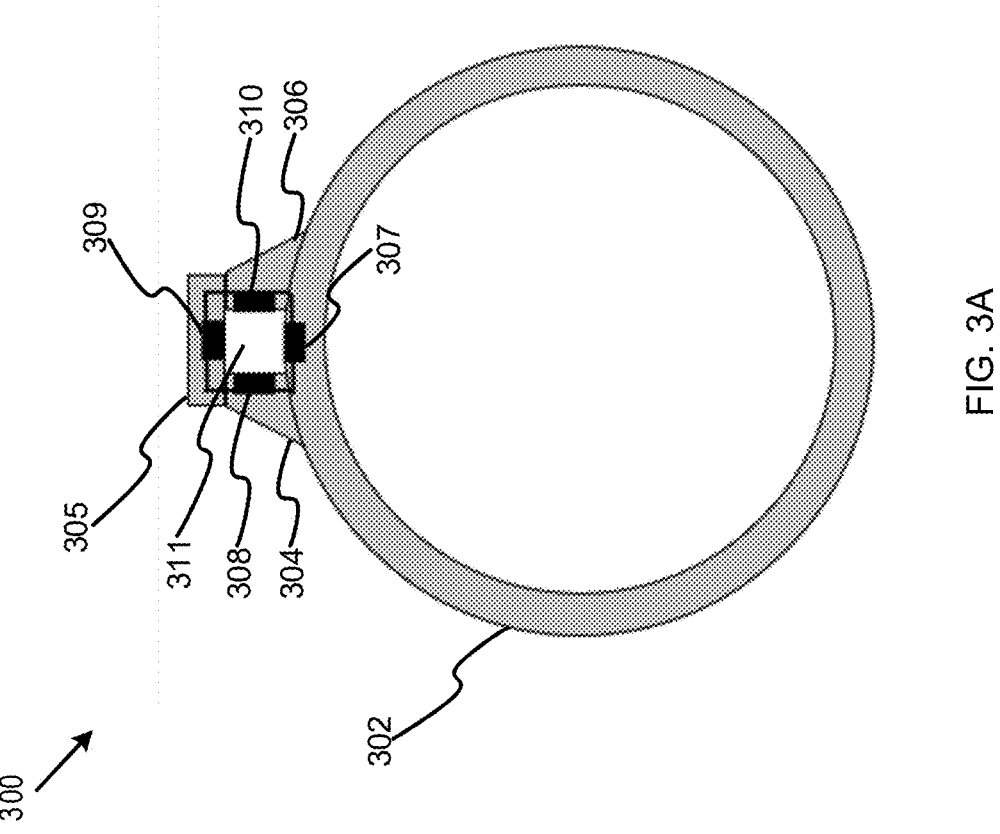

FIG. 3A-3B are schematics of an example transducer assembly, according to some implementations. In particular, FIG. 3A is a top view of a transducer assembly 300 (such as transducer assembly 150 of FIG. 1). The transducer assembly 300 is similar to the transducer assembly 200 of FIG. 2A. For example, the transducer assembly 300 includes fins 304 and 306 positioned on a segment of casing 302. Additionally, the transducer assembly includes plate 305 that may be approximately perpendicular to the fins 304 and 306. The segment of the casing 302 may be a collar, the body of a casing joint, or any other suitable component of a pipe positioned in a wellbore. For example, the transducer assembly 300 may be positioned on a packer integrated into a casing string, a casing shoe, etc. The fins 304, 306 may be embedded to the casing 302, mounted to the casing 302, etc. Each fin 304, 306 and the plate 305 may be constructed of steel, epoxy resin, or any other suitable material. Additionally, the transducer assembly 300 depicts the fins 304, 306 and the plate 305 on the external face of the casing 302. The fins 304, 306 and the plate 305 may be positioned on other points of the casing 302 to be in contact with cement. For example, if cement is to be placed in the internal area of the casing 302, the fins 304, 306 and the plate 305 may be positioned on the internal face of the casing 302 to contact the cement.

The area between fin 304, fin 306, and the plate 305 is a measurement channel 311 where fluids may flow through. For example, when the fins 304, 306, and the plate 305 are on the external face of the casing 302, fluid (such as cement)

may pass through the measurement channel 311 when cement is placed in the annular area between the wellbore wall and the external face of the casing.

The fin 304 is configured with a transducer 308. The fin 306 is configured with a transducer 310. The transducers 308 and 310 are each configured to transmit signals and/or receive response signals within the measurement channel 311. The signals may include ultrasonic signals, acoustic signals, etc. For example, transducer 308 may transmit an ultrasonic signal into the measurement channel 311 that is at least partially filled with cement. Response signals may be generated by the cement as the signals interact with the cement. The response signals may reflect off of the fin 306 and transmit back towards the fin 304 for the transducer 308 to receive. Alternatively, or in addition to, the transducer 310 may receive the response signals. In some implementations, the signal may be transmitted by transducer 310 and response signals may be received by transducer 308 and/or transducer 310. Additionally, the plate 305 is configured with a transducer 309 that may be approximately perpendicular to the transducers 308 and 310. A transducer 307 may be positioned parallel to the transducer 309 and approximately perpendicular to the transducers 308 and 310. The transducers 307, 309 may be similar to the transducers 308, 310. For example, a signal may be transmitted by transducer 307 and response signals may be received by transducer 307 and/or transducer 309. Alternatively, or in addition to, the signal may be transmitted by transducer 309 and response signals may be received by transducer 309 and/or transducer 307.

The internal faces of the fins 304 and 306 may be parallel to each other at a fixed distance. The transit time across the fixed distance between the two fins 304 and 306 (i.e., across the measurement channel 311) may be measured. For example, the time between when the transducer 308 transmits an ultrasonic signal into the measurement channel 311 and when the transducer 310 detects the response signal may be measured. Due to the fixed distance and transit time, the speed at which the signals traveled through the medium (cement, drilling mud, etc.) within the measurement channel 311 may be determined. The signal speed may then be correlated to the characteristics of the medium within the measurement channel. Operations for determining the cement characteristics are further described below. Likewise, the internal face of the plate 305 may be parallel to the face of the casing 302 where the transducer 307 is positioned. Hence, the characteristics of the cement in the measurement channel 311 may be determined via signals from the transducers 307, 309. In some implementations, the signals from each pair of transducers sets, e.g., transducer set 308, 310 and transducer set 307, 309, may be utilized to determine characteristics of the cements such as Poisson's ratio.

FIG. 3B is a side view of a transducer assembly 301. Similar to the transducer assembly 300 of FIG. 3A, the transducer assembly 301 includes a measurement channel formed by a plate 322 and two fins (not pictured) positioned on a casing 320. The fins may be parallel to each other at a fixed distance. In some implementations, the plate 322 and fins may be mounted in a spiral direction around the outside of the casing 320 to permit cement flow through the measurement channel and function as turbulizing elements. The plate 322 fins may be positioned in any suitable configuration that may allow fluid to pass through the measurement channel.

A cable 350 may be coupled with the transducers within the plate 322, casing (such as transducer 307 of FIG. 3A), each respective fin, and the surface to couple the transducer assembly 301 to the surface (such as a power source, computer 190 of FIG. 1, etc.). Additionally, the cable 350 may provide power to the transducer assembly 301. In some implementations, the cable 350 may be encapsulated in tubing, such as a steel pipe. Multiple transducer assemblies may be coupled to the cable 350. For example, the transducer assemblies may be in series and/or in parallel on the cable 350.

Example Operations

Example operations for outputting power to components of a flow control tool are now described in reference to FIGS. 2A-2B and FIGS. 3A-3B.

FIG. 4 is a flowchart of example operations for determining characteristics of cement in a wellbore, according to some implementations. FIG. 4 depicts a flowchart 400 of operations to determine characteristics of cement in a wellbore via a transducer assembly positioned on a casing string in the wellbore. Although the operations of the flowchart 400 are described in reference to cement, the operations of flowchart 400 may be applicable to any other suitable sealants in a wellbore such as epoxy resin. The operations of flowchart 400 are described in reference to the processor of the computer 190 of FIG. 1. Additionally, the operations of flowchart 400 are described in reference to the transducer assembly 150 of FIG. 1 and transducer assemblies 200 and 201 of FIGS. 2A and 2B, respectively.

The operations of the flowchart 400 may be performed during cementing operations such as circulation of fluids and/or sealants around a casing string, primary cementing of a casing string, post-cementing, plugging, cement squeezing, etc. For example, operations to determine characteristics of cement via a transducer assembly may be performed while fluids, such as drilling mud, may be circulated around the casing in preparation for cement and the fluids are flowing through the measurement channel of the transducer assembly, cement is being pumped into the wellbore and actively flowing through the measurement channel of a transducer assembly, pumping operations have seized and at least a portion of the measurement channel is filled with cement that is in process of hardening, etc.

At block 402, a transducer assembly may be positioned to a casing string disposed in a wellbore formed in a subsurface formation. The transducer assembly may be positioned on the casing such that it may contact the cement if/when cement is placed in the wellbore. For example, the transducer assembly may be positioned on the external face of the casing if cement is to be placed in the annular area of the casing (such as during drilling operations when casing is disposed in a wellbore). Alternatively, the transducer assembly may be positioned on the internal face of the casing if cement is to be placed inside the casing (such as during plugging operations). The transducer assembly may be positioned to the collar of the casing string or the body of the casing string.

In some implementations, more than one transducer assembly may be positioned on the casing. Multiple transducer assemblies may provide measurements of cement (or other fluid in the wellbore) at different depths. For example, one transducer may be positioned near the shoe of the casing to assist in indicating when the compressive strength of the cement is at a level where drilling operations may proceed. Another transducer assembly may be positioned on the casing at a shallower depth (uphole of the transducer assembly near the shoe) to assist in indicating the top of cement, if the cement covered a specific reservoir, etc.

Each of the transducer assemblies may be electrically coupled to a cable (such as a tubing encapsulated cable). The cable may provide power to each transducer assembly. Additionally, the cable may allow communication between the surface (such as the computer 190 of FIG. 1) and each respective transducer assembly. When there are multiple transducer assemblies, the transducer assemblies may be in series such that each transducer assembly may be controlled individually. In some implementations, the transducer assemblies may be in parallel on the cable.

At block 404, the processor of the computer 190 may transmit, via the transducer assembly, signals into the measurement channel of the transducer assembly. The measurement channel may be at least partially filled with cement. For example, during circulation or primary cementing operations, fluids such as mud and/or cement may be flowing through the measurement channel. Alternatively, during post cementing operations, the flow of fluids through the measurement channel may stop and the measurement channel may be filled with static fluids such as drilling mud, cement, or a combination of the like. One or more transducers within the transducer assembly may emit one or more signals, such as an ultrasonic signal, into the fluid within the measurement channel.

At block 406, the processor of the computer 190 may acquire, via the transducer assembly, response signals in response to transmission of the signals through the measurement channels. When the signals are emitted into the fluids within the measurement channel, the signals may interact with the fluid within the measurement channel to generate response signals. For example, the speed of the ultrasonic signals may change when they interact with the fluid, resulting in the generation of the response signals. The response signals may be detected by one or more transducers in the transducer assembly such as the transducer within the fin from which the signal originated from and/or the transducer within the other fin. The response signals may be communicated back to the computer 190 via the cable coupling the transducer assembly to the surface.

At block 408, the processor of the computer 190 may determine one or more characteristics of the cement in the measurement channel based on the response signal. The time between the emission of the signal into the measurement channel and the detection of the response signal in response to the transmission of the signal through the measurement channel may be measured. The transit time of the signal through the measurement channel and the fixed distance between the fins of the transducer assembly may then be utilized to determine the speed (i.e., time over a distance) of the signals. The speed at which the signals transmit through the measurement channel may be a function of the fluid within the measurement channel. For example, signals may travel faster in hardened cement than through fluid (such as cement that has not hardened, drilling mud, etc.).

Characteristics of the cement may include the compressive strength of the cement in the measurement channel. As the cement hardens, the compressive strength of the cement may increase. The speed of the signals through the cement may increase as the compressive strength increases. Thus, the speed of the signal may be correlated with a compressive strength of the cement. In some implementations, the compressive strength may be measured over a time period. For example, the transducer assembly may transmit and detect signals and response signals, respectively, throughout the cement operations to observe the compressive strength of the cement proximate the transducer assembly as the cement hardens once placed in the wellbore.

Alternatively, the speed may indicate what type of fluid may be flowing through the measurement channel during circulation and primary cementing operation. The signal speed through drilling mud may be slower than the signal speed through cement before hardening, indicating which type of fluid is in the annular area proximate the transducer assembly. Moreover, the speed may indicate what fluid is present in the measurement channel in post cementing operations. For instance, the cement column in the annular area may not reach the transducer assembly, and the measurement channel may be filled with only drilling mud, indicating the top of the cement column in the annular area. The characteristics may also include the percent of cement in the annular area proximate the transducer assembly. For example, only a portion of the measurement channel may be filled with hardened cement and the rest may be filled with drilling mud, indicating the percent of cement in the annular area proximate the transducer assembly.

At block 410, the processor of the computer 190 may perform a wellbore operation based on the characteristics of the cement. For example, if the compressibility strength is above a target threshold such as 500 pounds per square inch (psi), then the cement has hardened enough and drilling operations (such as drilling the next section of the wellbore) may continue. Alternatively, a compressive strength of 50 psi may be utilized as a threshold to indicate the cement is set and operations may proceed. The characteristics may indicate that the cement did not sufficiently cover a zone of the subsurface formation (such as a water bearing reservoir that may corrode the casing). Operations to squeeze cement into the zone of interest may be performed to protect the casing from the corrosive fluids of said zone.

In some implementations, during reverse cementing operations, the transit time of the signal across the measurement channel may indicate when cement has reached the shoe. For example, traditional cementing operations pump cement down the casing and circulate the cement around the shoe of the casing and into the annulus. Reverse cementing operations may pump cement down the annulus and up the casing. A transducer assembly may be positioned proximate the shoe of the casing. The transit times may be measured during reverse cementing operations to indicate when drilling mud is still at the shoe, and when the cement is at the shoe. The reverse cementing operations may end when the transit time indicates the cement has reached the shoe.

Example Computer

Figure 5:
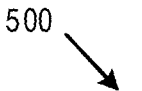
FIG. 5 depicts a flowchart of example operations for controlling the flow rate to a generator of a flow control tool, according to some implementations.

FIG. 5 is a block diagram depicting an example computer, according to some implementations. FIG. 5 depicts a computer 500 for determining characteristics of cement via one or more transducer assemblies positioned on casing in a wellbore. The computer 500 includes a processor 501 (possibly including multiple processors, multiple cores, multiple nodes, and/or implementing multi-threading, etc.). The computer 500 includes memory 507. The memory 507 may be system memory or any one or more of the above already described possible realizations of machine-readable media. The computer 500 also includes a bus 503 and a network interface 505. The computer 500 can communicate via transmissions to and/or from remote devices via the network interface 505 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 500 also includes a signal processor 511 and a controller 515 which may perform the operations described herein. For example, the signal processor 511 may determine one or more characteristics of cement in a measurement channel of a transducer assembly based on the response signals acquired from one or more transducers on the transducer assembly. The controller 515 may transmit a signal into a measurement channel and detect the response signal in response to the transmission of the signal through the measurement channel. The signal processor 511 and the controller 515 can be in communication. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for determining characteristics of cement via a transducer assembly positioned on casing in a wellbore as described herein may be implemented with facilities consistent with any hardware system or hardware systems. Many variations, modifications, additions, and improvements are possible.

Example Implementations

Implementation #1: A method comprising: positioning a transducer assembly to a casing string disposed in a wellbore formed in a subsurface formation, wherein an annular area between the casing string and the subsurface formation is at least partially filled with sealant; transmitting, via the transducer assembly, signals into a measurement channel of the transducer assembly that is at least partially filled with the sealant; acquiring, via the transducer assembly, response signals in response to transmission of the signals through the measurement channel; and determining one or more characteristics of the sealant in the measurement channel based on the response signals.

Implementation #2: The method of Implementation #1, wherein the transducer assembly is positioned on a collar of the casing string or a body of the casing string, and wherein the transducer assembly is positioned internal or external to the casing string.

Implementation #3: The method of Implementation #1 or #2, wherein the transducer assembly includes two or more fins, and wherein the measurement channel is an area between the two or more fins.

Implementation #4: The method of Implementation #3, wherein each of the fins is constructed of materials including steel or epoxy resin.

Implementation #5: The method of Implementation #3 or #4, wherein faces of the two or more fins are parallel to each other at a fixed distance and allows the sealant to flow into the area between the two or more fins, and wherein the two or more fins are oriented parallel to a central axis of the casing string or in a spiral direction about an exterior of the casing string.

Implementation #6: The method of any one or more of Implementations #1-5, wherein the signals include ultrasonic signals.

Implementation #7: The method of any one or more of Implementations #1-6, further comprising: measuring a time required for the signals to transition across a distance of the measurement channel, wherein the distance is a length between two or more fins; determining a speed of the signals transmitting through the distance of the measurement channel; and determining the one or more characteristics of the sealant based on the speed of the signals.

Implementation #8: The method of any one or more of Implementations #1-7, wherein the one or more characteristics are determined during cementing operations include operations during circulation, operations during primary cementing, and operations during post cementing.

Implementation #9: The method of any one or more of Implementations #1-8, wherein the one or more characteristics include compressive strength of the sealant and a percent of sealant at a location in the annular area proximate the transducer assembly.

Implementation #10: The method of any one or more of Implementations #1-9, wherein the sealant includes Portland cement, reduced Portland cement, Sorel cement, calcium aluminate-based cement, and epoxy resins.

Implementation #11: The method of any one or more of Implementations #1-10, wherein the transducer assembly electrically communicates to surface via a tubing encapsulated cable.

Implementation #12: A system comprising: a transducer assembly positioned to a casing string disposed in a wellbore formed in a subsurface formation, wherein an annular area between the casing string and the subsurface formation is at least partially filled with sealant; a processor; and a computer-readable medium having instructions stored thereon that are executable by the processor to cause the processor to, transmit, via the transducer assembly, signals into a measurement channel of the transducer assembly that is at least partially filled with the sealant; acquire, via the transducer assembly, response signals in response to transmission of the signals through the measurement channel; and determine one or more characteristics of the sealant in the measurement channel based on the response signals.

Implementation #13: The system of Implementation #12, wherein the transducer assembly is positioned on a collar of the casing string or a body of the casing string, and wherein the transducer assembly is positioned internally or external to the casing string.

Implementation #14: The system of Implementation #12 or #13, wherein the transducer assembly includes two or more fins, and wherein the measurement channel is an area between the two or more fins.

Implementation #15: The system of Implementation #14, wherein each of the fins is constructed of materials including steel or epoxy resin.

Implementation #16: The system of Implementation #14 or #15, wherein faces of the two or more fins are parallel to each other at a fixed distance and allows the sealant to flow into the area between the two or more fins, and wherein the two or more fins are oriented parallel to a central axis of the casing string or in a spiral direction about an exterior of the casing string.

Implementation #17: The system of any one or more of Implementations #12-16, wherein the transducer assembly electrically communicates to surface via a tubing encapsulated cable.

Implementation #18: An apparatus comprising; a casing string disposed in a wellbore formed in a subsurface formation, wherein an annular area between the casing string and the subsurface formation is at least partially filled with sealant; and a transducer assembly positioned on the casing string configured to, transmit, via the transducer assembly, signals into a measurement channel of the transducer assembly that is at least partially filled with the sealant; and acquire, via the transducer assembly, response signals in response to transmission of the signals through the measurement channel, wherein one or more characteristics of the sealant in the measurement channel are determined based on the response signals.

Implementation #19: The apparatus of Implementation #18, wherein the transducer assembly includes two or more fins, and wherein the measurement channel is an area between the two or more fins.

Implementation #20: The apparatus of Implementation #19, wherein faces of the two or more fins are parallel to each other at a fixed distance and allows the sealant to flow into the area between the two or more fins, and wherein the two or more fins are oriented parallel to a central axis of the casing string or in a spiral direction about an exterior of the casing string.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A method comprising:

positioning a transducer assembly to a casing string disposed in a wellbore formed in a subsurface formation, wherein an annular area between the casing string and the subsurface formation is at least partially filled with sealant;

transmitting, via the transducer assembly, signals into a measurement channel formed between a first fin and a second fin of the transducer assembly, the measurement channel being at least partially filled with the sealant, wherein a respective internal face of the first fin is parallel with the respective internal face of the second fin and spaced apart at a fixed distance to define a known signal path length;

acquiring, via the transducer assembly, response signals in response to transmission of the signals that have propagated through the measurement channel; and determining one or more characteristics of the sealant within the measurement channel based on transit time or propagation speed of the response signals across the measurement channel, wherein determining the one or more characteristics includes determining a percent of sealant occupying the measurement channel based on the transit time or the propagation speed of the response signals across the measurement channel.

2. The method of claim 1, wherein the transducer assembly is positioned on a collar of the casing string or a body of the casing string, and wherein the transducer assembly is positioned internal or external to the casing string.

3. The method of claim 1, wherein the transducer assembly includes two or more fins.

4. The method of claim 3, wherein each of the fins is constructed of materials including steel or epoxy resin.

5. The method of claim 3, wherein the two or more fins are oriented parallel to a central axis of the casing string or in a spiral direction about an exterior of the casing string.

6. The method of claim 1, wherein the signals include ultrasonic signals.

7. The method of claim 1, further comprising:

measuring the transit time required for the signals to transition across the fixed distance of the measurement channel, wherein the fixed distance is a length between two or more fins;

determining the propagation speed of the signals transmitting through the fixed distance of the measurement channel; and determining the one or more characteristics of the sealant based on the propagation speed of the signals.

8. The method of claim 1, wherein the one or more characteristics are determined during cementing operations include operations during circulation, operations during primary cementing, and operations during post cementing.

9. The method of claim 1, wherein the one or more characteristics include compressive strength of the sealant and a percent of the sealant at a location in the annular area proximate the transducer assembly.

10. The method of claim 1, wherein the sealant includes Portland cement, reduced Portland cement, Sorel cement, calcium aluminate-based cement, and epoxy resins.

11. The method of claim 1, wherein the transducer assembly electrically communicates to surface via a tubing encapsulated cable.

12. A system comprising:

a transducer assembly positioned to a casing string disposed in a wellbore formed in a subsurface formation, wherein an annular area between the casing string and the subsurface formation is at least partially filled with sealant;

a processor; and a computer-readable medium having instructions stored thereon that are executable by the processor to cause the processor to, transmit, via the transducer assembly, signals into a measurement channel formed between a first fin and a second fin of the transducer assembly, the measurement channel being at least partially filled with the sealant, wherein a respective internal face of the first fin is parallel with the respective internal face of the second fin and spaced apart at a fixed distance to define a known signal path length;

acquire, via the transducer assembly, response signals in response to transmission of the signals that have propagated through the measurement channel; and determine one or more characteristics of the sealant within the measurement channel based on transit time or propagation speed of the response signals across the measurement channel, wherein the one or more characteristics includes a percent of sealant occupying the measurement channel based on the transit time or the propagation speed of the response signals across the measurement channel.

13. The system of claim 12, wherein the transducer assembly is positioned on a collar of the casing string or a body of the casing string, and wherein the transducer assembly is positioned internally or external to the casing string.

14. The system of claim 12, wherein the transducer assembly includes two or more fins.

15. The system of claim 14, wherein each of the fins is constructed of materials including steel or epoxy resin.

16. The system of claim 14, wherein the two or more fins are oriented parallel to a central axis of the casing string or in a spiral direction about an exterior of the casing string.

17. The system of claim 12, wherein the transducer assembly electrically communicates to surface via a tubing encapsulated cable.

18. An apparatus comprising;

a casing string disposed in a wellbore formed in a subsurface formation, wherein an annular area between the casing string and the subsurface formation is at least partially filled with sealant; and a transducer assembly positioned on the casing string configured to, transmit, via the transducer assembly, signals into a measurement channel formed between a first fin and a second fin of the transducer assembly, the measurement channel being at least partially filled with the sealant wherein a respective internal face of the first fin is parallel with the respective internal face of the second fin and spaced apart at a fixed distance to define a known signal path length; and acquire, via the transducer assembly, response signals in response to transmission of the signals that have propagated through the measurement channel, wherein one or more characteristics of the sealant in the measurement channel are determined based on transit time or propagation speed of the response signals across the measurement channel, and wherein the one or more characteristics includes a percent of sealant occupying the measurement channel based on the transit time or the propagation speed of the response signals across the measurement channel.

19. The apparatus of claim 18, wherein the transducer assembly includes two or more fins.

20. The apparatus of claim 19, wherein the two or more fins are oriented parallel to a central axis of the casing string or in a spiral direction about an exterior of the casing string.

* * * * *